(12) United States Patent
Atramiz et al.

(10) Patent No.: US 11,376,835 B2
(45) Date of Patent: Jul. 5, 2022

(54) PACKAGING FILM HAVING DIRECT FOOD CONTACT IDENTIFIERS AND METHOD OF MAKING THEREOF

(71) Applicant: Amcor Flexibles Sarrebourg SAS, Paris (FR)

(72) Inventors: Eliana Atramiz, Bulach (CH); Frederic Froemer, Sarrebourg (FR)

(73) Assignee: Amcor Flexibles Sarrebourg SAS, Paris (FR)

( * ) Notice: Subject to any disclaimer, the term of this patent is extended or adjusted under 35 U.S.C. 154(b) by 0 days.

(21) Appl. No.: 17/266,051

(22) PCT Filed: Sep. 9, 2019

(86) PCT No.: PCT/EP2019/073934
§ 371 (c)(1),
(2) Date: Feb. 4, 2021

(87) PCT Pub. No.: WO2020/049183
PCT Pub. Date: Mar. 12, 2020

(65) Prior Publication Data
US 2021/0309004 A1    Oct. 7, 2021

(30) Foreign Application Priority Data
Sep. 7, 2018   (EP) .................................. 18193251

(51) Int. Cl.
*B32B 38/00*     (2006.01)
*B32B 38/04*     (2006.01)
(Continued)

(52) U.S. Cl.
CPC ........ *B32B 38/0008* (2013.01); *B23K 26/355* (2018.08); *B32B 27/06* (2013.01);
(Continued)

(58) Field of Classification Search
CPC ...................................................... B32B 38/04
See application file for complete search history.

(56) References Cited

U.S. PATENT DOCUMENTS

| 8,573,396 B2 | 11/2013 | Brownell |
| 2004/0048726 A1* | 3/2004 | Andersson .............. B32B 38/00 493/324 |

(Continued)

FOREIGN PATENT DOCUMENTS

| EP | 2565036 A1 | 3/2013 |
| GB | 2507810 A | 5/2014 |

(Continued)

*Primary Examiner* — Linda L Gray

(57) ABSTRACT

Method for producing a packaging film strip for providing a number of individual packaging film parts for packing food or beverages, wherein the packaging film contains for each designated individual packaging film part an area having a printed two-dimensional code as unique packaging or product identifier. The process comprises the steps of providing at least one first substrate film strip (10, 25), applying on one side of said at least one first substrate film strip (10, 25) an artwork printing (20) for each individual packaging film part, depositing a DFC ink area (28) for each individual packaging film part onto the surface of the substrate film strip (10, 12) lying opposite to the artwork printing (20), slitting the packaging film to provide a series of individual packaging film parts running along the longside of the packaging film, ablating the individual DFC ink areas (28) by a computer-controlled laser beam (8) for providing a predetermined and individual code (2, 3, 30) as unique packaging or product identifier, cleaning the surface of the film strip comprising the individual codes (2, 3, 30), and checking the quality of the codes (2, 3, 30).

15 Claims, 4 Drawing Sheets

(51) Int. Cl.
  *B32B 38/16*   (2006.01)
  *B32B 37/12*   (2006.01)
  *B32B 27/06*   (2006.01)
  *B41M 5/24*    (2006.01)
  *B65H 35/02*   (2006.01)
  *B29C 65/10*   (2006.01)
  *B23K 26/352*  (2014.01)
  *B32B 27/32*   (2006.01)
  *B65D 65/40*   (2006.01)
  *B65D 65/42*   (2006.01)
  *B23K 101/34*  (2006.01)

(52) U.S. Cl.
  CPC .............. *B32B 27/32* (2013.01); *B32B 37/12* (2013.01); *B32B 38/04* (2013.01); *B32B 38/145* (2013.01); *B32B 38/162* (2013.01); *B41M 5/24* (2013.01); *B65D 65/40* (2013.01); *B65D 65/42* (2013.01); *B23K 2101/34* (2018.08); *B32B 2038/045* (2013.01); *B32B 2255/10* (2013.01); *B32B 2255/205* (2013.01); *B32B 2310/0843* (2013.01); *B32B 2439/70* (2013.01); *B65D 2203/06* (2013.01); *Y10T 156/1067* (2015.01); *Y10T 156/1087* (2015.01)

(56) References Cited

U.S. PATENT DOCUMENTS

| | | | |
|---|---|---|---|
| 2016/0185085 A1* | 6/2016 | Spigaroli | B32B 27/32 |
| | | | 525/88 |
| 2017/0239686 A1* | 8/2017 | Jahromi | C23C 16/545 |
| 2018/0099798 A1* | 4/2018 | Lehrter | B32B 27/08 |

FOREIGN PATENT DOCUMENTS

| | | |
|---|---|---|
| WO | 2016148587 A1 | 9/2016 |
| WO | 2017190962 A1 | 11/2017 |
| WO | 2017207179 A1 | 12/2017 |

\* cited by examiner

PACKAGING FILM HAVING DIRECT FOOD CONTACT IDENTIFIERS AND METHOD OF MAKING THEREOF

The invention relates to a method for producing a packaging film strip for providing a number of individual packaging film parts for packing food or beverages, wherein the packaging film contains for each designated individual packaging film part an area having a printed two-dimensional code as unique packaging or product identifier.

The use of a marking on the surface of packaging materials is known per se.

EP-A1-2,565,036 describes a packaging material for making packages of products comprising at least one sheet of material and having a portion provided with at least one covering layer arranged for interacting with a laser beam for making visible marks on said portion, in particular information identifying a product to be packaged. The laser beam removes by ablation or vaporisation defined portions of the covering layer in such a manner as to uncover underlying portions of the packaging material or of a further covering layer interposed between the covering layer and the sheet of material. The covering layers comprise inks having different and/or contrasting colours.

WO-A1-2017/190962 describes a process for making a laser coded fold wrapped food concentrate tablet. The process comprises the steps of first laser ablating a code on a packaging material and second fold wrapping the tablet with the laser coded packaging material. The laser code is located visibly at an overlapping packaging area of the wrapping.

Many consumer packaged products utilize flexible sheet-like materials or films that are formed into pouch-like packages that have one or more sealed closures and enclose a volume, which contains all or a portion of a product. When a product includes a plurality of types of elements, one or more packages may be employed to contain each type of element separately. U.S. Pat. No. 8,573,396 provides embodiments and methods for those packages when marking of the one or more individual packages is necessary, e.g. for lot traceability and/or for providing to the consumer information and/or for decorative purposes. Those packages include marks formed by a material that is not exposed to either an element contained within the package nor to an element that is outside the package and with which the package directly interfaces, e.g. when both the element and the package are contained within an outer package. According to U.S. Pat. No. 8,573,396 an inner package and/or an outer package of a packaged product can include a mark formed by a material which is contained within a sealed closure of the package. Consequently, the mark is always contained within the sealed closure. In order to make the mark readable from the outside of the package, the flexible film is transparent in an area coinciding with the mark.

GB-A-2507810 describes a metal package, in particular a food, beverage or aerosol can, marked with a code, which is at least partially hidden, obscured or invisible when the package is sealed. Upon opening of the package the code is revealed or becomes machine-readable. The code may be ablated onto, etched into or printed onto the surface of the metal package. Said code is applied to an internal surface of the metal package, which surface would otherwise come into contact with the product. Therefore, the code is coated by a substantially clear lacquer to protect the product from the code and any chemical component contained in said code marking.

The ink markings described in the prior art documents mentioned above do not have direct food contact.

The aim of present invention is to provide an individual two-dimensional code on a flexible film strip as primary packaging material that may come in direct contact with food.

According to the present invention there is provided a method for producing a packaging film strip for providing a number of individual packaging film parts for packing food or beverages having the features of claim 1.

The packaging film contains for each designated individual packaging film part an area having a printed two-dimensional code as unique packaging or product identifier. The process comprises the steps of:

a) providing at least one first substrate film strip,
b) one side of said at least one first substrate film strip is provided with an artwork printing for each individual packaging film part,
c) the side of said at least one first substrate film strip comprising the artwork printing is optionally laminated to a second substrate film strip using an adhesive layer, or a second substrate film is optionally extruded onto the at least one first substrate film strip,
d) the surface of the one first or the second substrate film strip lying opposite to the artwork printing is provided with a direct food contact ink (DFC ink) area for each individual packaging film part, wherein the DFC ink area is designated to be present at an inner layer of each individual packaging film part having direct food contact,
e) the packaging film comprising the artwork printing and the DFC ink areas is slitted to provide a series of individual packaging film parts running along the longside of the packaging film,
f) ablating the individual DFC ink areas by a computer-controlled laser beam for providing a predetermined and individual code as unique packaging or product identifier,
g) cleaning the surface of the film strip comprising the individual codes, and
h) checking the quality of the codes.

Preferred embodiments of the inventive process are described in the dependent claims.

The process may be controlled by the type of ink, the grammage application of the direct food contact (DFC) ink, the substrate film/s used, the speed of the substrate film in a roll to roll process, the moving speed of the laser beam, the laser energy and the laser wave-length application.

The direct food contact ink area, also identified as DFC ink area, onto the film strip may be provided by standard printing technology as e.g. flexo- or rotogravure. The DFC ink has to be direct food contact approved. The DFC ink area is a full surface printed area preferably having a uniform DFC ink layer thickness. During the later process said DFC ink layer is partially removed from said ink area deposited onto the film strip using a laser equipment and generating a predefined variable code. The packaging film parts are repetitive film parts having the same repetitive artwork printing and the same repetitive DFC ink area, but with different codes in said DFC print areas. Each film part corresponds to a single packaging piece.

The ablating process can be done before or after the slitting process.

The ablating process for producing the individual codes on each individual packaging film part is a computer-controlled process, preferably able to manage variable data as serial codes and is in particular able to create unique, serialized QR codes, DM codes (data matrix codes) or alphanumeric codes. The minimum dimension of a QR code is preferably 10 mm×10 mm. Alphanumeric texts may be used as dates, ingredients or product use recommendations.

The DFC ink and the film strip substrate are preferably chosen to provide excellent contrast between the substrate as background and the image defined by the applied code.

The DFC ink composition comprises preferably food additives dissolved in a food contact approved coating resin and in particular is a water-based or solvent-based ink. The DFC ink can be deposited by either a flexo or gravure process. The DFC ink preferably has no odour emission and may be deposited on a wide range of coated, metallised and uncoted polypropylene (PP), paper and film substrates made of polyester or polyethylene. A minimum treatment level of $38 \times 10^{-5}$ N/cm is usually required to ensure good adhesion.

The DFC inks used for the inventive process preferably comply with EC regulation no. 1935/2004, with EuPIA "Good Manufacturing Practice—Printing Inks for Food Contact Materials", $4^{th}$ version of March 2016, with EuPIA Guidance for Risk Assessment of Non-intentionally Added Substances and Non-listed Substances in printing inks for food contact materials (January 2017), wherein Monomers and additives, as well as aids of polymerisation should be listed in EU Plastic Regulation no. 10/2011. Pigments used in the inventive process should comply with the specifications of Council of Europe Resolution AP(89)1 and should be listed in Ordinance of the FDHA (CH) 817.023.21, annex 6, II list, part A and solvents used in the DFC inks should be listed in EU Plastic Regulation no. 10/2011 or Ordinance of the FDHA (CH) 817.023.21, annex 6, III list, part A including all amendments.

The process is preferably a roll to roll process, wherein in process step (a) the film strip is unrolled from a roll and after process step (h) the film strip is rewinded resulting in a roll.

The roll-to-roll in-line process on printing, slitting, ablating and cleaning is preferably done at a speed of the film strip of between 50 to 350 m/min.

Preferably, the film strip has a width of between 1000 and 1400 mm.

A preferred grammage of 1.0 to 1.5 g/m² of DFC ink is homogeneously deposited in the DFC ink area for each individual packaging part.

The production of the individual codes is preferably done by ablating the DFC ink in the DFC ink area program-controlled using a $CO_2$ laser beam having a typical wavelength of 10.6 µm. Said laser does not affect the quality of the substrate film strip.

The thickness of the DFC ink layer, the speed of the film strip and the applied laser energy flux have to be chosen such that between 98% and 100% of the DFC ink are removed on the ablated area.

The inventive process is a contact-free process without creating any mechanical stress, damage or perforation to the substrate film strip.

The laser ablating process of the DFC ink areas is particularly done at a speed of 1000 to 3000 bits/ms using a laser power of between 6 to 30 W.

For the ablating process at least one laser head emitting at least one laser beam is used. In a preferred embodiment of the process, especially in a roll-to-roll manufacturing process, several, in particular 2 to 5, laser heads are arranged parallel to the longitudinal direction of the film strip. The number of said parallel arranged laser heads is particularly set by the size of the laser heads and the number of artwork repetitions per reel core width.

The cleaning of the surface of the packaging film strip comprising the individual codes may be done using a sticky roll.

The film strip is preferably made of a flexible packaging material and preferably comprises at least one film made of polypropylene (PP), polyethylene terephthalate (PET), polyethylene (PE), paper, or aluminium.

A particularly preferred substrate film strip is a polymeric monolayer or a metallised polymeric monolayer. In particular, the substrate film strip may consist of a metallised oriented polypropylene.

In a further preferred embodiment, the film strip has a multilayer structure comprising a first substrate film strip preferably made of polypropylene (PP) or polyethylene terephthalate (PET) provided with an artwork printing and a second substrate film strip preferably made of polypropylene (PP) or polyethylene (PE), wherein the side of the first substrate film strip comprising the artwork printing is laminated to the second substrate film strip using an intermediate adhesive layer, or the second substrate film is extruded onto the first substrate film, wherein the DFC ink area is applied to the surface of the second substrate film strip lying opposite to the artwork printing.

Preferably, each individual code is unique and is one selected from a matrix barcode as a Quick Response (QR) code, a Data Matrix (DM) code or an alphanumeric code. The code may contain alphanumeric texts as dates, indication of ingredients or product use recommendations.

Preferably, each individual DFC ink area has a minimum size of 100 mm² and has in particular a rectangular size of 10 mm×10 mm to 30 mm×30 mm.

The DFC ink is preferably a water- or solvent-based ink optionally comprising organic or inorganic pigments approved for food contact.

The quality check of the codes includes checking the correct position of the code on the film strip in machine and cross direction, checking the print quality using for example an ink adhesion tape test and checking the readability. The readability is preferably checked in-line by using a high-speed camera and a marking system. Said camera will detect missing codes or not readable codes and mark it to later be cleaned.

The invention will now be described by way of examples and with reference to the accompanying drawings in which.

Figure 1:
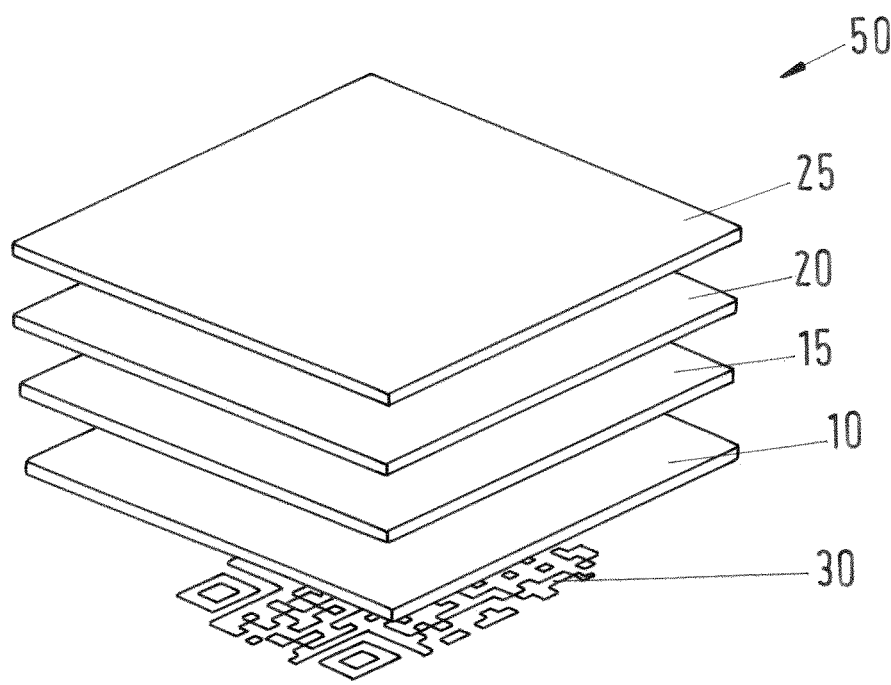
FIG. 1 shows an exploded view of a part of a multilayer structure of a film strip produced according to the invention.

FIG. 1 shows schematically an exploded view of a part of a multilayer structure 50 of a film strip produced by applying the inventive method. The multilayer structure 50 comprises a substrate film strip 10 made for example of PP or PE that is covered on one side with an adhesive layer 15 onto which an artwork printing 20 is provided that is protected by an outermost polymer layer 25 made for example of PP or PET. The other side of the substrate film strip 10 comprises a QR code 30 made of a DFC ink.

Figure 2:
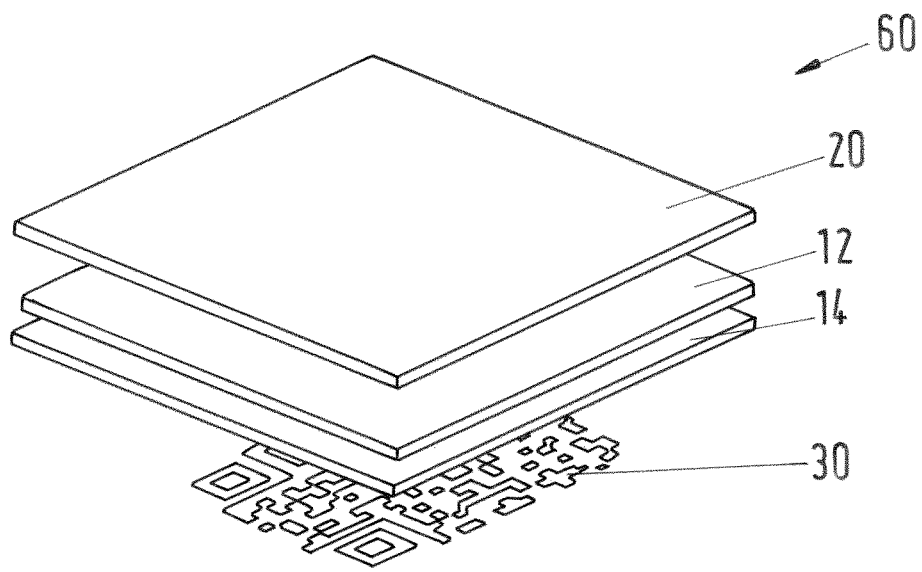
FIG. 2 shows an exploded view of a part of a monolayer structure of a film strip produced according to the invention.

FIG. 2 shows schematically an exploded view of a part of a monolayer structure 60 of a film strip produced by applying the inventive method. The monolayer structure 60 comprises a substrate film strip made of a metallised OPP film, wherein the metal layer 12 may be evaporated onto the OPP film 14. The one side of the OPP film 14 covered with the metal layer 12 comprises the artwork printing 20. Consequently, the metal layer 12 is deposited on top of the OPP film 14 and is in contact with the artwork printing 20. The free surface of the OPP film 14 lying opposite to the metal layer 12 comprises a QR code 30 made of a DFC ink.

Figure 3:
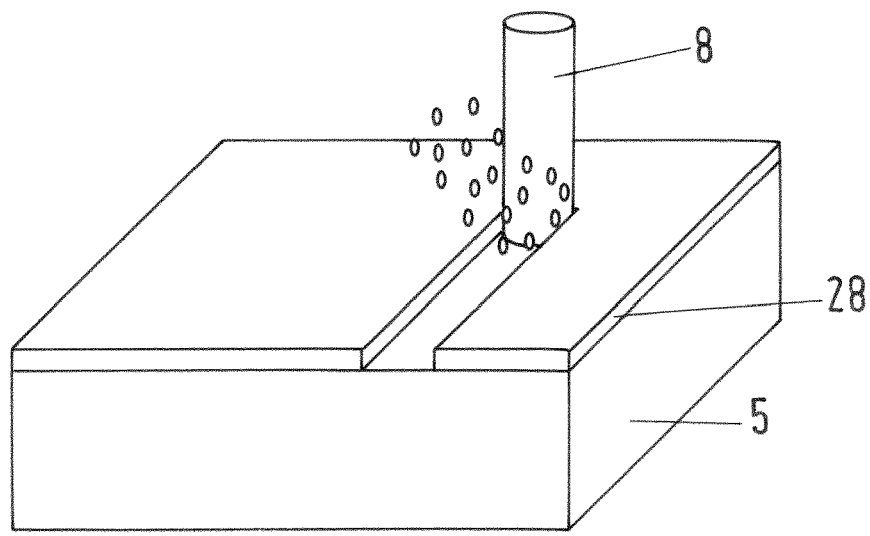
FIG. 3 shows schematically a perspective view of a part of a film strip during ablation of the DFC ink layer.

FIG. 3 shows schematically a perspective view of a part of a film strip during a program-controlled ablation of a part of a DFC ink layer 28 by a laser beam 8. The DFC ink layer 28 is directly deposited onto a surface of a base material 5 comprising at least one substrate film strip and on its side lying opposite to the DFC ink layer 28 the base material 5 comprises an artwork printing layer (not shown).

Figure 4:
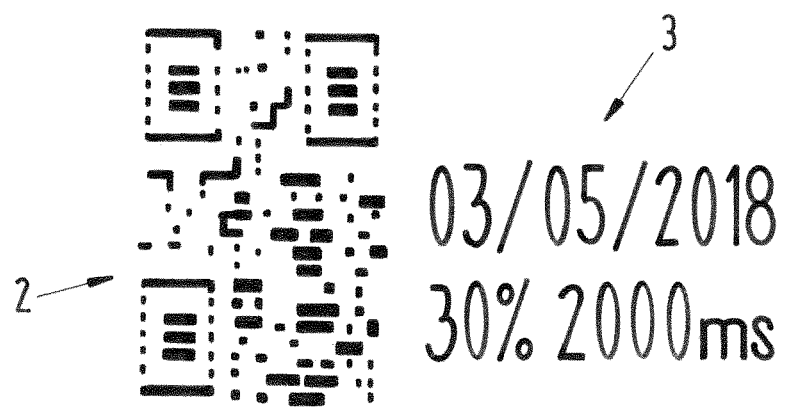
FIG. 4 shows an example of an individual code.

FIG. 4 shows an example of an individual code consisting of a QR code 2 and an alphanumeric code 3.

Figure 5:
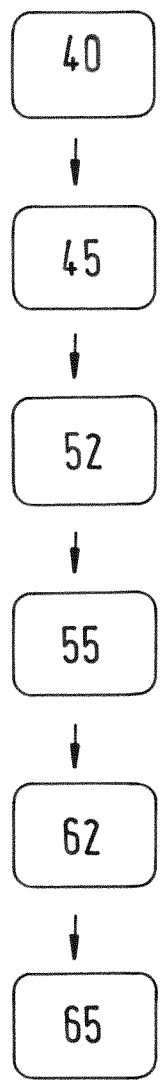
FIG. 5 shows the workflow for producing a packaging film comprising a monolayer gravure surface DFC ink printing using an off-line ablation process.

FIG. 5 shows the workflow for producing continuously a packaging film comprising a monolayer gravure surface DFC ink printing using an off-line ablation process. In a first step 40 a standard artwork surface printing 20 is applied onto one side of the substrate film strip 14 which may comprise a metal layer 12 on the side where the artwork printing is deposited. In a second step 45 the other surface of the substrate film strip lying opposite to the artwork printing 20 is provided with a number of repetitive DFC ink areas. The first and second steps 40, 45 may also be done in a single step, e.g. using a turn bar. In a third process step 52, the film strip comprising the artwork printing 20 and the DFC ink areas is slitted to provide a series of individual packaging film parts running along the longside of the film strip. In a forth process step 55 the individual DFC ink areas are ablated by a computer-controlled laser beam 8 to produce the individual codes 2, 3, 30. In a fifth process step 62 the surface of the film strip comprising the individual codes 2, 3, 30 is cleaned. In a last sixth process step 65 the quality or readability of the codes 2, 3, 30 is checked.

Figure 6:
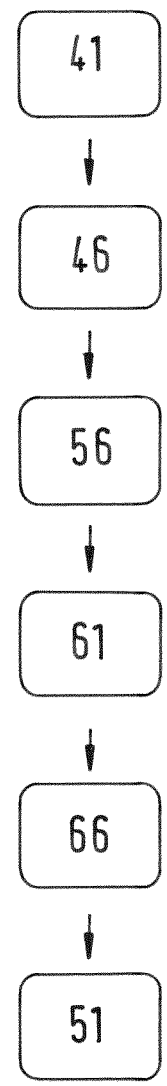
FIG. 6 shows the workflow for producing a packaging film comprising a monolayer gravure surface DFC ink printing using an in-line ablation process.

FIG. 6 shows the workflow for producing continuously a packaging film comprising a monolayer gravure surface DFC ink printing using an in-line ablation process. In a first step 41 a standard artwork surface printing 20 is applied onto one side of the substrate film strip 14 which may comprise a metal layer 12 on the side where the artwork printing 20 is deposited. In a second step 46 the other surface of the substrate film strip 14 lying opposite to the artwork printing 20 is provided with a number of repetitive DFC ink areas. The first and second steps 41, 46 may also be done in a single step, e.g. using a turn bar. In a third step 56 of the continuous roll-to-roll process the individual DFC ink areas are ablated by a computer-controlled laser beam 8 to produce the individual codes 2, 3, 30. In a forth process step 61 the surface of the film strip comprising the individual codes 2, 3, 30 is cleaned. In a fifth process step 66 the quality or readability of the codes 2, 3, 30 is checked. In a sixth process step 51, the film strip comprising the artwork printing 20 and the DFC ink areas is slitted to provide a series of individual packaging film parts running along the longside of the film strip.

Figure 7:
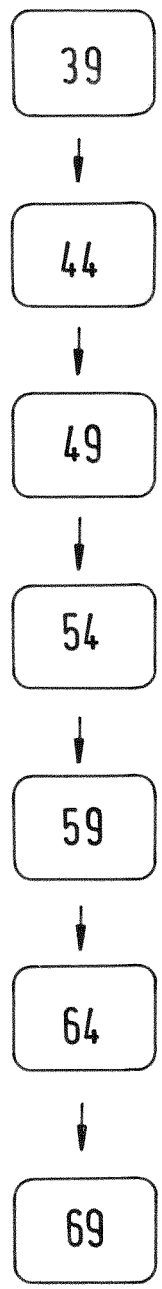
FIG. 7 shows the workflow for producing a packaging film comprising a multilayer gravure DFC ink printing with adhesive or extrusion lamination comprising off-line DFC printing and ablation.

FIG. 7 shows the workflow for producing a packaging film comprising a multilayer gravure DFC ink printing with adhesive or extrusion lamination and comprising off-line DFC printing and ablation processes. In a first step 39 a standard artwork surface printing 20 is applied onto a first polymer film 25 and in a second step 44 said first polymer film 25 on the side comprising the artwork printing 20 is laminated to the second substrate film strip 10 using an intermediate adhesive layer 15, or the second film strip 10 is extruded onto the side of the first substrate film strip 25 having the artwork printing. In a third process step 49 the other surface of the second substrate film strip 10 lying opposite to the artwork printing 20 is provided with a number of repetitive DFC ink areas. In a forth process step 54, the film strip comprising the artwork printing 20 and the DFC ink areas is slitted to provide a series of individual packaging film parts running along the longside of the film strip. In a fifth process step 59, the individual DFC ink areas are ablated by a computer-controlled laser beam 8 to produce the individual codes 2, 3, 30. In a sixth process step 64 the surface of the second film strip 10 comprising the individual codes 2, 3, 30 is cleaned. In a last seventh process step 69 the quality or readability of the codes 2, 3, 30 is checked.

Figure 8:
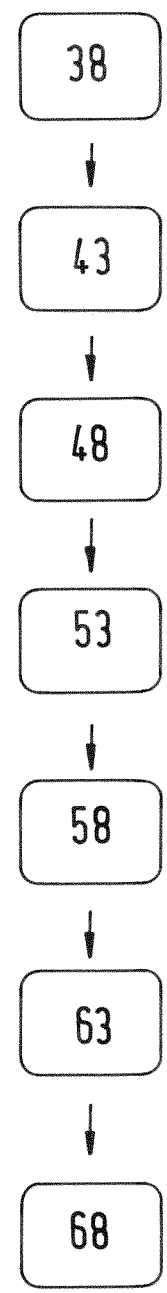
FIG. 8 shows the workflow for producing a packaging film comprising a multilayer gravure DFC ink printing with adhesive or extrusion lamination comprising in-line DFC printing and ablation.

FIG. 8 shows the workflow for producing a packaging film comprising a multilayer gravure DFC ink printing with adhesive or extrusion lamination and comprising in-line DFC printing and ablation processes. In a first step 38 a standard artwork surface printing 20 is applied onto a first polymer film 25 and in a second step 43 said first polymer film 25 on the side comprising the artwork printing 20 is laminated to the second substrate film strip 10 using an intermediate adhesive layer 15, or the second film strip 10 is extruded onto the side of the first substrate film strip 25 having the artwork printing. In a third process step 48 the other surface of the second substrate film strip 10 lying opposite to the artwork printing 20 is provided with a number of repetitive DFC ink areas. In a forth process step 53, the individual DFC ink areas are ablated by a computer-controlled laser beam 8 to produce the individual codes 2, 3, 30. In a fifth process step 58 the surface of the second film strip 10 comprising the individual codes 2, 3, 30 is cleaned. In a sixth process step 63 the quality or readability of the codes 2, 3, 30 is checked. In a seventh process step 68 the film strip comprising the artwork printing 20 and the DFC ink areas is slitted to provide a series of individual packaging film parts running along the longside of the film strip.

The invention claimed is:

1. Method for producing a packaging film strip for providing a number of individual packaging film parts for packing food or beverages, wherein the packaging film strip contains for each said individual packaging film part an area having a printed two-dimensional code as a packaging or product identifier, the process comprising the steps of:
   a) providing at least one first substrate film strip (10, 25),
   b) one side of said at least one first substrate film strip (10, 25) is provided with an artwork printing (20) for each said individual packaging film part,
   c) the side of said at least one first substrate film strip (25) comprising the artwork printing (20) is optionally laminated to a second substrate film strip (10) using an adhesive layer (15), or a second substrate film strip (10) is optionally extruded onto the at least one first substrate film strip,
   d) a surface of the one first or second substrate film strip (10, 12) lying opposite to the artwork printing (20) is provided with a direct food contact ink (DFC ink) area (28) for each said individual packaging film part, wherein the direct food contact ink area (28) is designated to be present at an inner layer of each said individual packaging film part having direct food contact, e) the packaging film strip comprising the artwork printing and the direct food contact ink areas is slitted to provide a series of individual packaging film parts running along a longside of the packaging film strip, f) ablating the direct food contact ink areas (28) by a computer-controlled laser beam (8) for providing a predetermined and individual printed two-dimensional code (2, 3, 30) as the packaging or product identifier, g) cleaning a surface of the packaging film strip comprising the printed two-dimensional codes (2, 3, 30), and h) checking a quality of the printed two-dimensional codes (2, 3, 30).

2. Method according to claim 1, characterised in that the individual packaging film parts are repetitive film parts having a same repetitive artwork printing (20) and a same repetitive direct food contact ink area (28), but with different printed two-dimensional codes (2, 3, 30) in said direct food contact ink areas.

3. Method according to claim 1, characterised in that the process is a roll to roll process, wherein in process step (a) the at least one first substrate film strip is unrolled from a roll and after process step (h) the packaging film strip is rewinded on a reel.

4. Method according to claim 3, characterised in that the roll to roll process of printing, slitting, ablating and cleaning is done at a speed of the packaging film strip of between 50 to 350 m/min.

5. Method according to claim 1, characterised in that the packaging film strip has a width of between 1000 and 1400 mm.

6. Method according to claim 1, characterised in that a grammage of 1.0 to 1.5 g/m² of a direct food contact ink is homogeneously deposited in the direct food contact ink area for each said individual packaging film part.

7. Method according to claim 1, characterised in that the production of the printed two-dimensional codes (2, 3, 30) is done by ablating the direct food contact ink in the direct food contact ink area using a laser beam (8) of a CO2 laser having a wavelength of 10.6 μm.

8. Method according to claim 1, characterised in that the ablating of the direct food contact ink areas is done at a moving speed of the computer controlled laser beam of 1000 to 3000 bits/ms using a laser power of between 6 to 30 W.

9. Method according to claim 1, characterised in that several laser heads are arranged parallel to a longitudinal direction of the packaging film strip.

10. Method according to claim 1, characterised in that the cleaning of the surface of the packaging film strip comprising the printed two-dimensional codes (2, 3, 30) is done using a sticky roll.

11. Method according to claim 1, characterised in that the at least one first substrate film strip is a polymeric monolayer or a metallised polymeric monolayer.

12. Method according to claim 11, characterised in that the packaging film strip consists of a metallised oriented polypropylene.

13. Method according to claim 1, characterised in that the packaging film strip has a multilayer structure comprising the first substrate film strip (25) provided with the artwork printing (20) and the second substrate film strip (10), wherein the side of said at least one first substrate film strip (25) comprising the artwork printing (20) is laminated to the second substrate film strip (10) using the intermediate adhesive layer (15), wherein the direct food contact ink area is applied to the surface of the second substrate film strip (10) lying opposite to the artwork printing (20).

14. Method according to claim 1, characterised in that each said individual code and is one selected from a matrix barcode as a Quick Response (QR) code, a Data Matrix (DM) code or an alphanumeric code.

15. Method according to claim 14, characterised in that said individual codes contain alphanumeric texts as dates, indication of ingredients or product use recommendations.

* * * * *